(12) United States Patent
Nagano

(10) Patent No.: US 10,119,491 B2
(45) Date of Patent: Nov. 6, 2018

(54) CONTROLLER FOR INTERNAL COMBUSTION ENGINE

(71) Applicant: TOYOTA JIDOSHA KABUSHIKI KAISHA, Toyota-shi, Aichi-ken (JP)

(72) Inventor: Shota Nagano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 228 days.

(21) Appl. No.: 14/744,787

(22) Filed: Jun. 19, 2015

(65) Prior Publication Data

US 2015/0369165 A1 Dec. 24, 2015

(30) Foreign Application Priority Data

Jun. 23, 2014 (JP) ................................. 2014-128432

(51) Int. Cl.
*F02D 41/40* (2006.01)
*F02D 41/38* (2006.01)
(Continued)

(52) U.S. Cl.
CPC ........... *F02D 41/40* (2013.01); *F02D 35/023* (2013.01); *F02D 35/028* (2013.01);
(Continued)

(58) Field of Classification Search
CPC ...... F02D 41/40; F02D 35/023; F02D 35/028; F02D 41/008; F02D 41/3827;
(Continued)

(56) References Cited

U.S. PATENT DOCUMENTS 4,543,176 A * 9/1985 Harada ............. G01N 27/4065
204/406
4,726,345 A * 2/1988 Masaomi ............ F02D 35/0007
123/198 DB (Continued)

FOREIGN PATENT DOCUMENTS

JP 2005-320872 A 11/2005
JP 2011-085061 A 4/2011
JP 2014-025380 A 2/2014

*Primary Examiner* — David Hamaoui
*Assistant Examiner* — Susan Scharpf
(74) *Attorney, Agent, or Firm* — Oliff PLC

(57) ABSTRACT

A controller for an internal combustion engine, the internal combustion engine including a fuel injection valve configured to supply fuel into a cylinder. The controller includes an electronic control unit configured to acquire an actual heat generation rate at time of combustion; and correct at least one of fuel injection pressure or amount of fuel injected when deviation amount between reference heat generation rate gradient and actual heat generation rate gradient is equal to or greater than predetermined value such that the deviation decreases. The reference heat generation rate gradient is a gradient of a predetermined reference heat generation rate at which a predetermined time elapses after a heat generation rate begins to rise. The actual heat generation rate gradient being a gradient of an actual heat generation rate acquired by the electronic control unit at which the predetermined time elapses after the heat generation rate begins to rise.

3 Claims, 10 Drawing Sheets

(51) Int. Cl.
*F02D 35/02* (2006.01)
*F02D 41/00* (2006.01)

(52) U.S. Cl.
CPC ....... *F02D 41/008* (2013.01); *F02D 41/3827* (2013.01); *F02D 2041/0015* (2013.01); *F02D 2200/0602* (2013.01); *F02D 2250/31* (2013.01); *F02D 2250/38* (2013.01); *Y02T 10/44* (2013.01)

(58) Field of Classification Search
CPC ..... F02D 2041/0015; F02D 2200/0602; F02D 2250/31; F02D 2250/38; Y02T 10/44
USPC ........................................................ 701/104
See application file for complete search history.

(56) References Cited

U.S. PATENT DOCUMENTS

| | | | | |
|---|---|---|---|---|
| 6,058,905 | A * | 5/2000 | Nagaishi | F02D 33/00 123/295 |
| 7,532,971 | B2 * | 5/2009 | Sasaki | F02D 35/023 123/299 |
| 8,175,789 | B2 * | 5/2012 | Kojima | F02D 35/025 123/299 |
| 8,353,196 | B2 * | 1/2013 | Ibuki | F02D 35/02 73/35.02 |
| 2005/0247285 | A1 | 10/2005 | Nagai et al. | |
| 2007/0079811 | A1 * | 4/2007 | Nakane | F02D 41/403 123/478 |

* cited by examiner

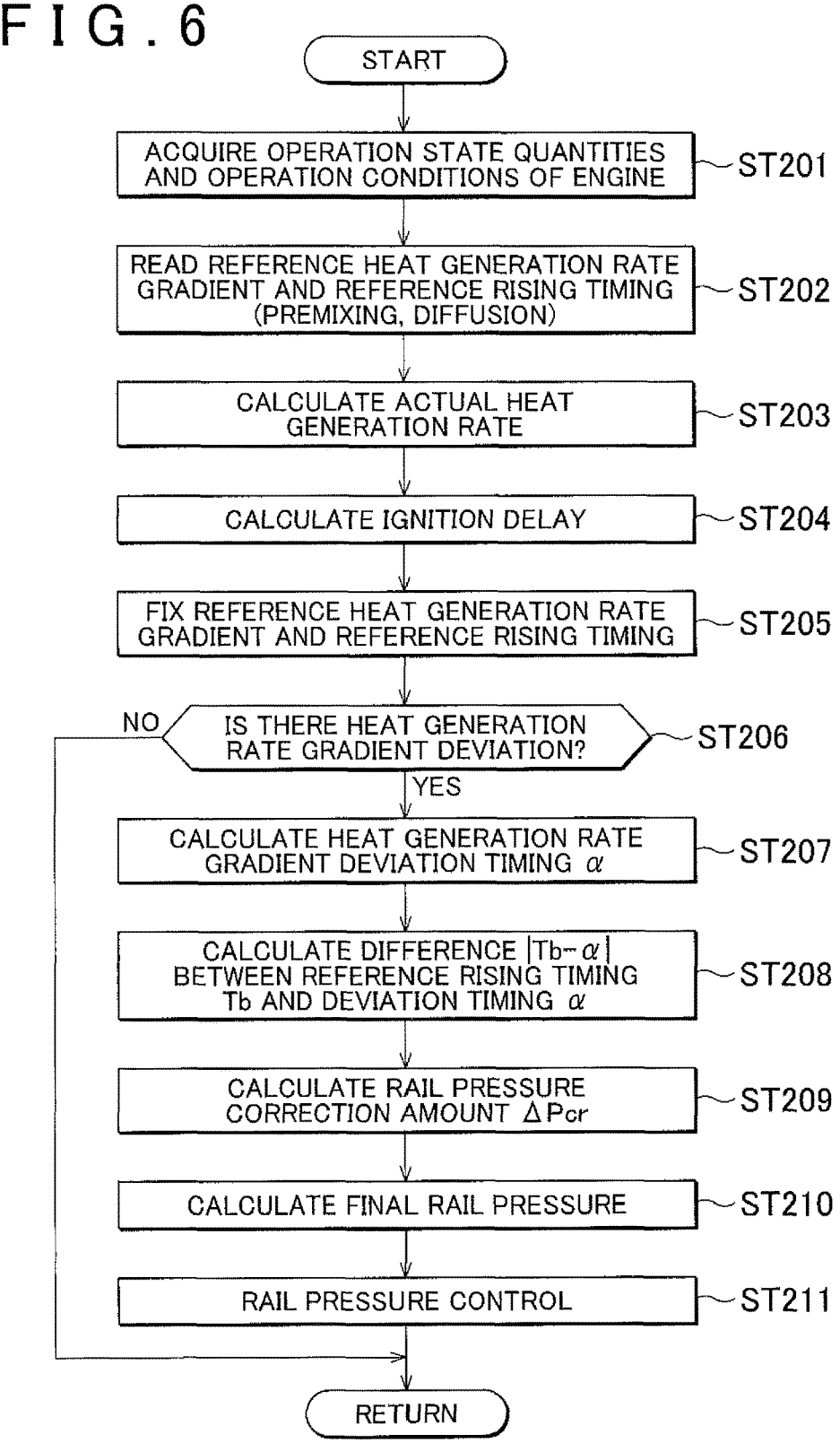

CONTROLLER FOR INTERNAL COMBUSTION ENGINE

INCORPORATION BY REFERENCE

The disclosure of Japanese Patent Application No. 2014-128432 filed on Jun. 23, 2014 including the specification, drawings and abstract is incorporated herein by reference in its entirety.

BACKGROUND OF THE INVENTION

1. Field of the Invention

The present invention relates to a controller for an internal combustion engine.

2. Description of the Related Art

In internal combustion engines (hereinafter referred to as engines) such as diesel engines mounted on vehicles or the like, when an actual heat generation rate at the time of combustion (the amount of heat generated per unit rotational angle of a crankshaft: $dQ/d\theta$) is obtained, and when there is a difference between the actual heat generation rate and a reference heat generation rate, engine control parameters are corrected. For example, in a technique described in Japanese Patent Application Publication No. 2005-320872 (JP 2005-320872 A), an actual heat generation rate is estimated from in-cylinder pressure detected by an in-cylinder pressure sensor, and when there is a difference between a tilt angle (actual heat generation rate gradient) of rising of the actual heat generation rate and a tilt angle (reference heat generation rate gradient) of rising of the heat generation rate in a standard condition, the supply pressure of fuel is corrected such that the difference is eliminated.

SUMMARY OF THE INVENTION

When the amount of oxygen is small with respect to fuel and combustion degrades in combustion of a diesel engine or the like, the gradient of the rising of the actual heat generation rate does not diverge from the reference heat generation rate gradient but the actual heat generation rate gradient and the reference heat generation rate gradient diverge from each other in the course of the heat generation rate gradient (after the actual heat generation rate rises). That is, the actual heat generation rate gradient does not diverge from the reference heat generation rate gradient immediately after the actual heat generation rate begins to rise, but the actual heat generation rate gradient and the reference heat generation rate gradient diverge from each other after a predetermined time passes from the time when the actual heat generation rate begins to rise. Therefore, when a deviation occurs in the course of such a heat generation rate gradient, it is necessary to correct this deviation. However, it is not possible to cope with this with the technique described in the above-mentioned JP 2005-320872 A.

It is the object of the invention to provide a controller for an internal combustion engine capable of performing the correction of suppressing degradation of combustion resulting from shortage of the amount of oxygen with respect to fuel.

—Solving the Object—

According to one aspect of the invention, there is provided a controller for an internal combustion engine. The internal combustion engine includes a fuel injection valve configured to supply fuel into a cylinder. The controller includes an electronic control unit configured to i) acquire an actual heat generation rate at the time of combustion; and ii) correct at least one of a fuel injection pressure or an amount of fuel injected when a deviation amount between a reference heat generation rate gradient and an actual heat generation rate gradient is equal to or greater than a predetermined value such that the deviation decreases. The reference heat generation rate gradient is a gradient of a predetermined reference heat generation rate at which a predetermined time elapses after a heat generation rate begins to rise. The actual heat generation rate gradient is a gradient of an actual heat generation rate acquired by the electronic control unit at which the predetermined time elapses after the heat generation rate begins to rise. The reference heat generation rate gradient is a gradient of a hypotenuse of a waveform of an ideal heat generation rate (a waveform of a reference heat generation rate) in a heat generation rate rising period to be described later.

—Operation—

When the actual heat generation rate gradient becomes gentle in the course of the heat generation rate gradient (after the actual heat generation rate rises) and the actual heat generation rate gradient diverges from the reference heat generation rate gradient, it can be said that the deviation results from shortage of the amount of oxygen with respect to fuel. On the basis of such knowledge, in the aspect of the invention, the shortage of the amount of oxygen with respect to fuel is solved so as to suppress generation of smoke by correcting at least one of the fuel injection pressure or the amount of fuel injected when the deviation amount between the reference heat generation rate gradient and the actual heat generation rate gradient at which a predetermined time elapses after a heat generation rate begins to rise is equal to or greater than the predetermined value. The shortage of the amount of oxygen with respect to fuel may be solved so as to suppress generation of smoke by correcting at least one of the rail pressure and the main injection amount.

In the aspect of the invention, when the rail pressure is corrected, the correction of making the rail pressure high is performed to improve a spray state, thereby making the mixed state of fuel and oxygen excellent. When the main injection amount is corrected, the shortage of oxygen with respect to fuel is solved by correcting the main injection amount to decrease. The rail pressure correction and the main injection amount correction may be executed in combination.

In the present invention, the deviation timing (crank angle) at which the deviation amount between the reference heat generation rate gradient and the actual heat generation rate gradient becomes equal to or greater than the predetermined value may be obtained, and the farther the deviation timing is separated from the reference peak timing at which the reference heat generation rate becomes maximum, the greater correction amount may be set for at least one of the fuel injection pressure or the amount of fuel injected. That is, the farther the deviation timing is separated from the reference peak timing at which the reference heat generation rate becomes maximum, the greater correction amount may be set for at least one of the rail pressure or the main injection amount. The deviation timing at which the deviation amount between the reference heat generation rate gradient and the actual heat generation rate gradient becomes equal to or greater than the predetermined value may be obtained, and a greater correction amount may be set for at least one of the fuel injection pressure or the amount of fuel injected as the deviation timing is closer to the timing at which the reference heat generation rate begins to rise. That is, as the deviation timing is closer to the timing at which the reference heat generation rate begins to rise, a greater amount may be set for at least one of the rail pressure or the main injection amount.

Here, when the amount of oxygen is small with respect to fuel, the actual heat generation rate gradient becomes gentle earlier (the deviation timing of the actual heat generation rate gradient is separated from the reference peak timing) as the shortage of the amount of oxygen is greater. Therefore, the farther the deviation timing at which the deviation amount between the reference heat generation rate gradient and the actual heat generation rate gradient becomes equal to or greater the predetermined value is separated from the reference peak timing, the greater the above correction amount becomes. Accordingly, the shortage of the amount of oxygen with respect to fuel can be corrected precisely, and generation of smoke can be more effectively suppressed. Similarly, generation of smoke can be more effectively suppressed by setting the above greater correction amount as the deviation timing is closer to the timing at which the reference heat generation rate begins to rise.

As a specific configuration of the invention, a configuration can be adopted in which, in an internal combustion engine which has a plurality of cylinders and has swirl control valves provided in the respective cylinders, when the deviation amount between the reference heat generation rate gradient and the actual heat generation rate gradient is equal to or greater than the predetermined value, deviation timings at which the deviation amount between the reference heat generation rate gradient and the actual heat generation rate gradient becomes equal to or greater than the predetermined value are obtained for the respective cylinders, and at least one of the openings of the swirl control valves or the amounts of fuel injected of the respective cylinders is corrected so that the deviation timings of the respective cylinders become the same timing. The variations in the heat generation rate gradient deviation timings between the cylinders can be corrected by adopting such a configuration.

In this case, the average value of the deviation timings of the plurality of cylinders may be calculated and the correction of correcting at least one of the openings of the swirl control valves of the respective cylinders or the amounts of fuel injected to the respective cylinders so that the deviation timings of the respective cylinders become the average value (the same timing), and the correction of setting a greater correction amount for at least one of the fuel injection pressure (rail pressure) or the amount of fuel injected (main injection amount) as the average value of the deviation timings is separated farther from the reference peak timing at which the reference heat generation rate becomes maximum may be executed. Otherwise, the average value of the deviation timings of the plurality of cylinders may be calculated and the correction of correcting at least one of the openings of the swirl control valves of the respective cylinders or the amounts of fuel injected to the respective cylinders so that the deviation timings of the respective cylinders become the average value (the same timing), and the correction of setting a greater correction amount for at least one of the fuel injection pressure (rail pressure) or the amount of fuel injected (main injection amount) as the average value of the deviation timings is closer to a timing at which the reference heat generation rate begins to rise may be executed.

According to one aspect of the invention, it is possible to suppress degradation of combustion resulting from the shortage of the amount of oxygen with respect to fuel, and suppress generation of smoke.

BRIEF DESCRIPTION OF THE DRAWINGS

Features and advantages, and technical and industrial significance of exemplary embodiments of the invention will be described below with reference to the accompanying drawings, in which like numerals denote like elements, and wherein:

FIG. 3 is a block diagram illustrating a configuration of a control system of an ECU and the like;

FIG. 6 is a flowchart illustrating another example of the correction control;

DETAILED DESCRIPTION OF EMBODIMENTS

Hereinafter, an embodiment of the invention will be described with reference to the drawings.

In this embodiment, a case where the invention is applied to a common-rail in-cylinder direct injection type multi-cylinder (for example, in-line four cylinders) diesel engine (compression self-ignition internal combustion engine) mounted on an automobile will be described.

—Configuration of Engine—

Figure 1:
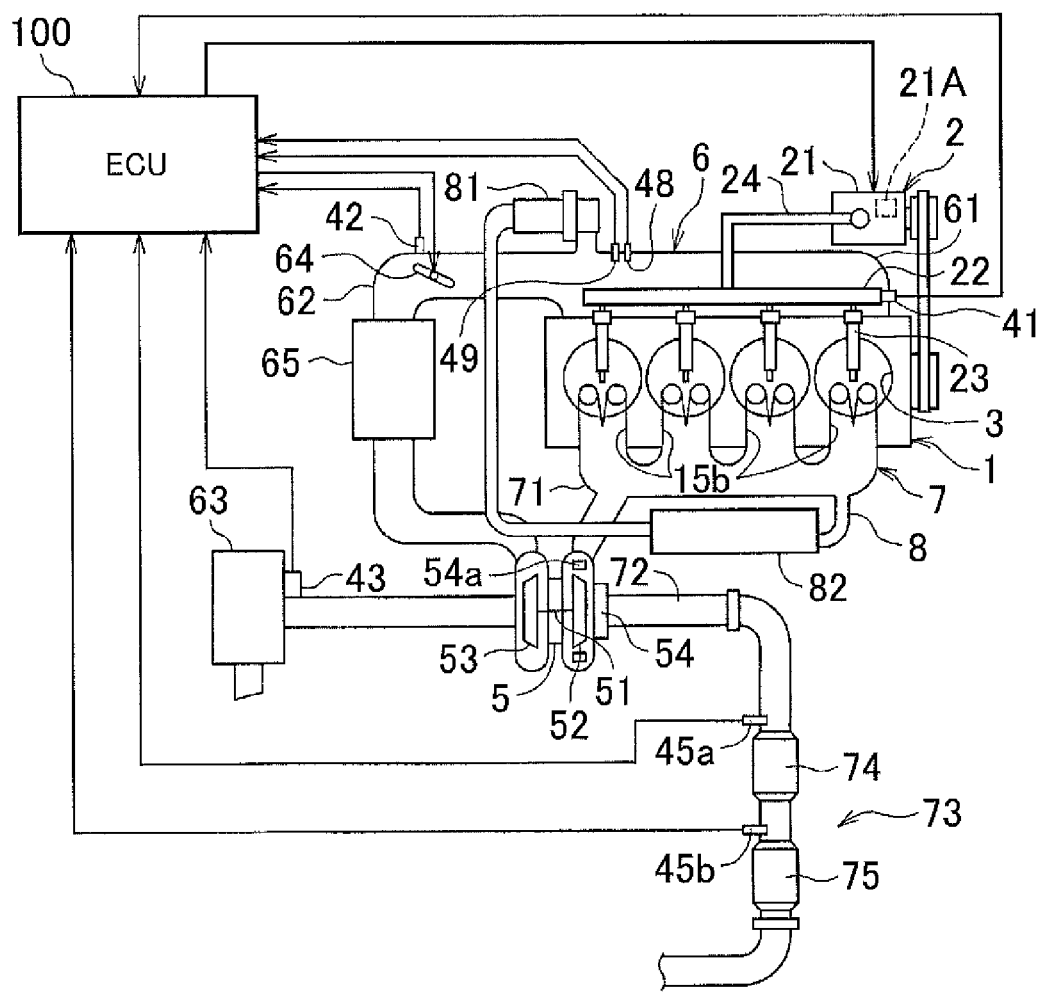
FIG. 1 is a diagram illustrating a schematic configuration of a diesel engine and a control system thereof to which the invention is applied.

FIG. 1 is a schematic configuration diagram of a diesel engine 1 (hereinafter simply referred to as an engine) and a control system thereof to which the invention is applied.

As illustrated in FIG. 1, the engine 1 is constituted as a diesel engine system including a fuel supply system 2, a combustion chamber 3, an intake system 6, an exhaust system 7, and the like as principal parts.

The fuel supply system 2 includes a supply pump 21, a common rail 22, injectors (fuel injection valves) 23, an engine fuel passage 24, and the like.

The supply pump 21 converts fuel pumped from a fuel tank into a high-pressure fuel and then supplies the high-pressure fuel to the common rail 22 via the engine fuel passage 24. The supply pump 21 includes a suction control valve 21A. The suction control valve 21A is controlled by an electronic control unit 100 (ECU). The fuel to be pumped to the common rail 22 is metered by the control of the suction control valve 21A, and pressure in the common rail 22 (hereinafter, the pressure in the common rail 22 is referred to as rail pressure) is controlled.

The common rail 22 has a function as an accumulation chamber holding (accumulating) the high-pressure fuel at a predetermined pressure and distributes the accumulated fuel to the respective injectors 23. Each injector 23 is a piezoelectric injector including a piezoelectric element therein and can adjust the amount of fuel injected into the combustion chamber 3 by controlling a valve-opening period.

The intake system 6 includes an intake manifold 61 connected to an intake port 15a formed in a cylinder head 15 (refer to FIG. 2), and an intake pipe 62 is connected to the intake manifold 61. In the intake system 6, an air cleaner 63, an air flow meter 43, and an intake throttle valve (diesel throttle) 64 are disposed sequentially from the upstream side.

A dual system of a normal port and a swirl port is provided as the intake port 15a for each cylinder, and a swirl control valve 66 (refer to FIG. 2) is arranged in each normal port. The opening (SCV opening) of the swirl control valve 66 is controlled by the ECU 100. The larger the opening of the swirl control valve 66 becomes, the lower the flow rate (hereinafter, referred to as a swirl rate) of a swirl flow in the combustion chamber 3 (in a cylinder) becomes, and conversely, the smaller the opening of the swirl control valve 66 becomes, the higher the swirl rate in the combustion chamber 3 becomes.

The cylinder head 15 is provided with an in-cylinder pressure sensor 4A (refer to FIG. 3) which detects combustion pressure in the combustion chamber 3. The in-cylinder pressure sensor 4A is provided in each cylinder.

The exhaust system 7 includes an exhaust manifold 71 connected to an exhaust port 15b formed in the cylinder head 15, and an exhaust gas pipe 72 is connected to the exhaust manifold 71. An exhaust gas control unit 73 is disposed in the exhaust system 7. The exhaust gas control unit 73 is equipped with a NOx storage reduction (NSR) catalyst 74 as a NOx occlusion reduction type catalyst and a diesel particulate filter (DPF) 75.

Figure 2:
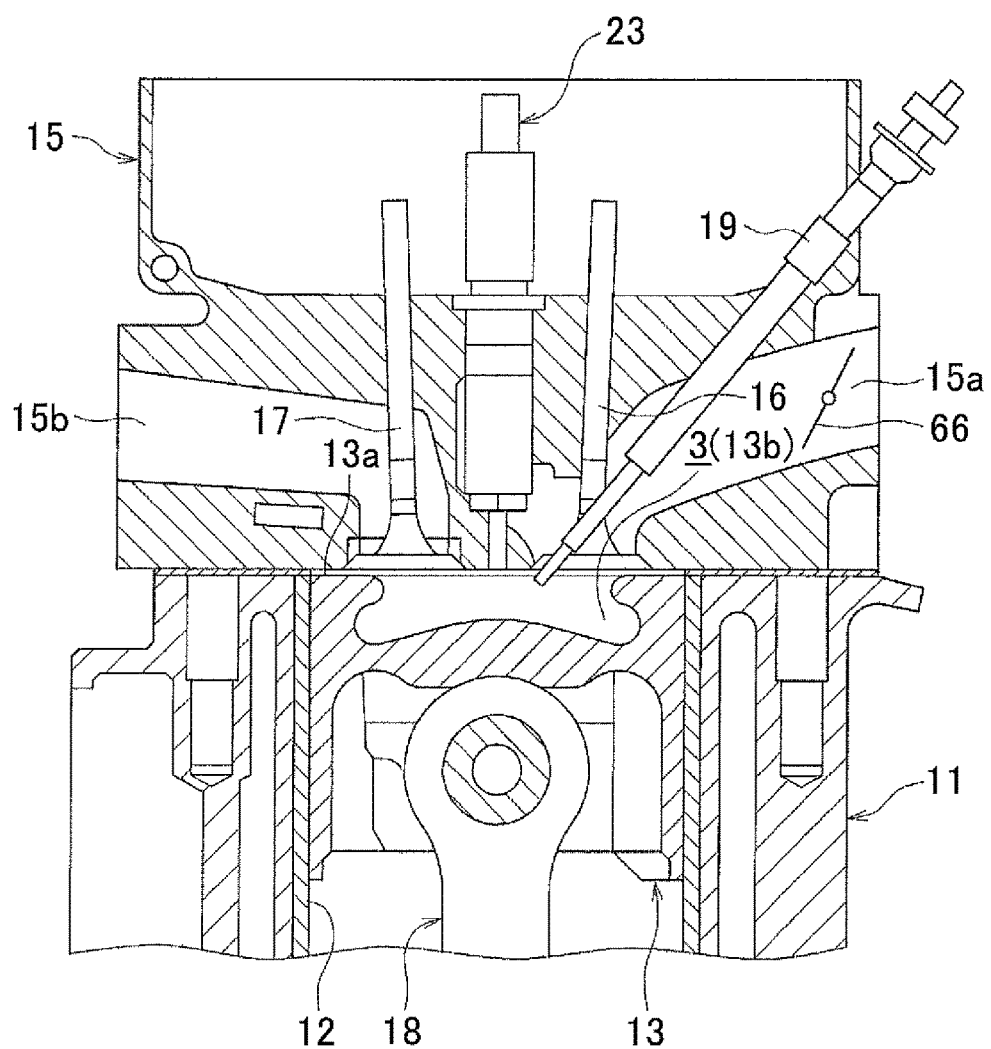
FIG. 2 is a cross-sectional view illustrating a combustion chamber of the diesel engine and a peripheral portion thereof.

As illustrated in FIG. 2, in a cylinder block 11, a cylinder bore 12 is formed for each cylinder (four cylinders) and a piston 13 is housed in each cylinder bore 12 so as to be slidable in the vertical direction.

The combustion chamber 3 is formed on a top surface 13a of the piston 13. That is, the combustion chamber 3 is defined by a bottom surface of the cylinder head 15 attached to an upper part of the cylinder block 11, an inner wall surface of the cylinder bore 12, and the top surface 13a of the piston 13. A cavity (recessed portion) 13b is formed substantially at a central portion of the top surface 13a of the piston 13, and the cavity 13b also constitutes a part of the combustion chamber 3.

The piston 13 is connected to a crankshaft which is an engine output shaft via a connecting rod 18. A glow plug 19 is disposed toward the combustion chamber 3.

An intake valve 16 for opening or closing the intake port 15a and an exhaust valve 17 for opening or closing the exhaust port 15b are disposed in the cylinder head 15.

As illustrated in FIG. 1, the engine 1 is provided with a supercharger (turbocharger) 5. The turbocharger 5 includes a turbine wheel 52 and a compressor impeller 53 coupled to each other via a turbine shaft 51. The turbocharger 5 of this example is a variable nozzle type turbocharger, a variable nozzle vane mechanism 54 is provided on the turbine wheel 52 side, and supercharging pressure can be adjusted by changing the opening of a nozzle vane 54a of the variable nozzle vane mechanism 54.

The intake pipe 62 is provided with an intercooler 65 for cooling the intake air of which the temperature is raised by the supercharging using the turbocharger 5.

The engine 1 is provided with an exhaust gas recirculation passage (EGR passage) 8 for appropriately recirculating a part of the exhaust gas to the intake system 6. The EGR passage 8 is provided with an EGR valve 81 and an EGR cooler 82.

—ECU—

Figure 3:
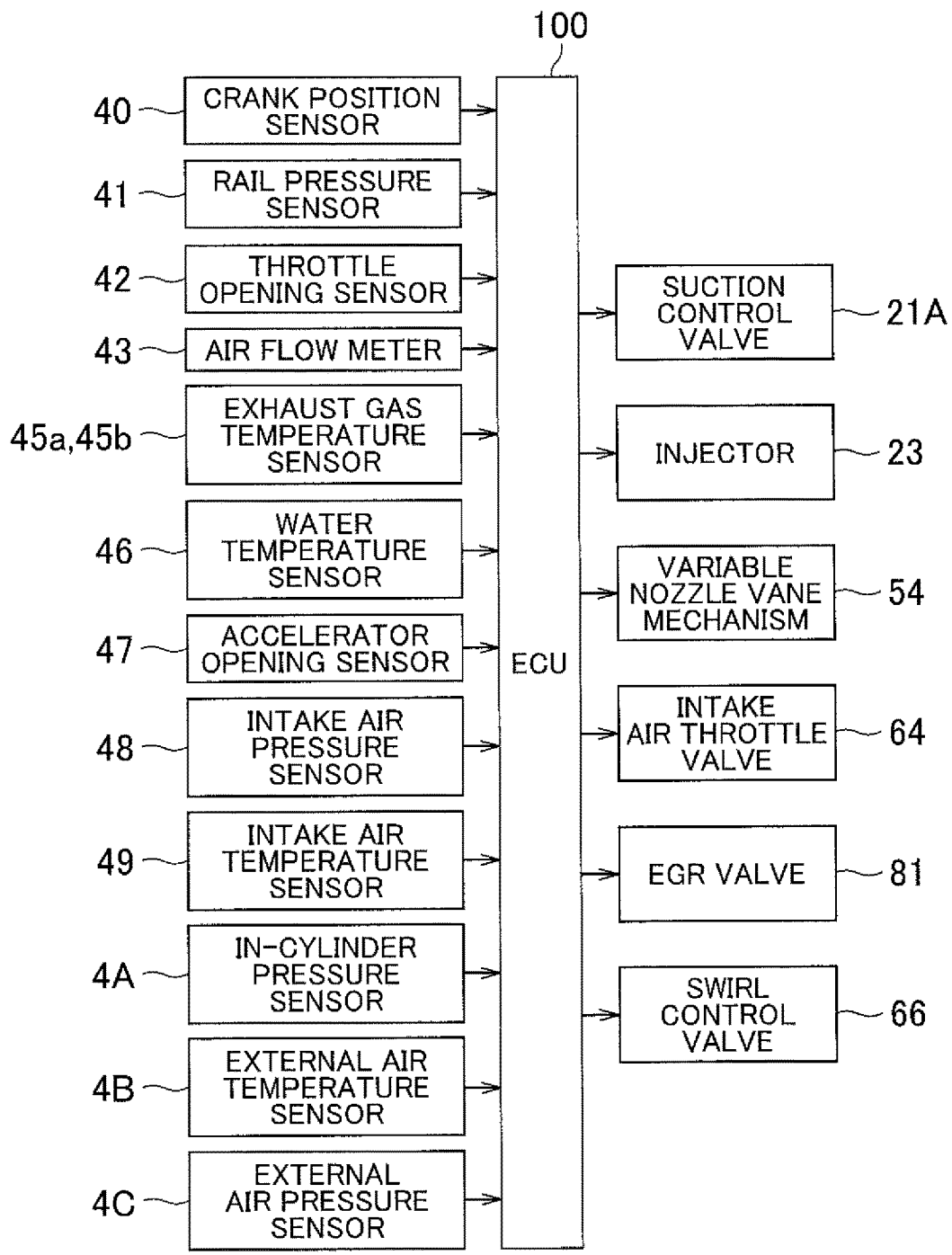

The ECU 100 includes a microcomputer consisting of a CPU, a ROM, a RAM (not illustrated), and the like and input and output circuits. As illustrated in FIG. 3, a crank position sensor 40, a rail pressure sensor 41, a throttle opening sensor 42, an air flow meter 43, exhaust gas temperature sensors 45a and 45b, a water temperature sensor 46, an accelerator opening sensor 47, an intake air pressure sensor 48, an intake air temperature sensor 49, an in-cylinder pressure sensor 4A, an external air temperature sensor 4B, an external air pressure sensor 4C, and the like are connected to the input circuit of the ECU 100.

Meanwhile, the suction control valve 21A of the supply pump 21, the injector 23, the variable nozzle vane mechanism 54, the intake throttle valve 64, the EGR valve 81, the swirl control valve 66, and the like are connected to the output circuit of the ECU 100.

The ECU 100 performs a variety of control of the engine 1 on the basis of output values from the above-mentioned sensors, calculated values obtained by calculation expressions using the output values, or various maps stored in the ROM.

For example, the ECU 100 determines the amount of fuel injected and a fuel injection pattern on the basis of an engine operation state. Specifically, the ECU 100 performs fuel injection control by calculating an engine rotation speed on the basis of a detection value of the crank position sensor 40, obtaining the amount of stepping (accelerator opening) of an accelerator pedal on the basis of a detection value of the accelerator opening sensor 47, and determining the total amount of fuel injected (the sum of an injection amount in pilot injection and an injection amount in main injection) and the fuel injection pattern on the basis of the engine rotation speed and the accelerator opening. In addition, after injection and post injection other than the pilot injection and the main injection are performed if necessary. The functions of these kinds of injection are well known.

The ECU 100 controls the opening of the EGR valve 81 according to the operation state of the engine 1, and adjusts the amount of exhaust gas recirculated (EGR amount) toward the intake manifold 61. The ECU 100 controls an actuator of the variable nozzle vane mechanism 54 and adjusts the opening of the nozzle vane 54a, thereby adjusting the supercharging pressure.

A plurality of ideal heat generation rate waveforms (reference heat generation rate waveforms) are stored in advance in the ROM of the ECU 100, with operation state quantities and operation conditions of the engine 1 as parameters. In detail, ideal heat generation rate waveforms for premix combustion and a plurality of ideal heat generation rate waveforms for diffusive combustion are stored in the ROM of the ECU 100.

More specifically, an ideal heat generation rate waveform (refer to FIG. 5) approximated to an isosceles triangle is stored in the ROM of the ECU 100, a reference peak position (crank angle) can be read from the position of the vertex of the isosceles triangle, and a reference heat generation rate gradient can be read from the gradient of a hypotenuse (a hypotenuse in a heat generation rate rising period) of the isosceles triangle. A rising timing (reference rising timing (crank angle)) of a reference heat generation rate can be read from the position of the rising of the isosceles triangle.

Here, the "ideal heat generation rate waveform" is a heat generation rate waveform to be theoretically obtained supposing a case where combustion efficiency is sufficiently high, in a state where an amount of fuel injected according to a command injection amount, a fuel injection pressure (rail pressure) according to a command fuel injection pressure, and a fuel injection period according to a command injection period are secured. The ideal heat generation rate waveform varies according to the amounts of operational quantities (the engine rotation speed, the accelerator opening, and the like) and the operation conditions (a coolant temperature, an intake air temperature, and the like) of the engine 1. Therefore, the plurality of ideal heat generation rate waveforms according to the operation state quantities and the operation conditions of the engine 1 are stored in advance in the ROM of the ECU 100. The respective ideal heat generation rate waveforms are obtained in advance by experiments, simulations, or the like. In the present invention, an ideal heat generation rate is also referred to as a reference heat generation rate waveform, and the ideal heat generation rate is also referred to as a reference heat generation rate.

As will be described below, a reference heat generation rate gradient and a reference peak position (or reference rising timing) of a reference heat generation rate waveform according to the actual operation state quantities and the actual operation conditions of the engine 1 is read among the plurality of reference heat generation rate waveforms stored (set) in advance in the ROM of the ECU 100, and the deviation between the reference heat generation rate gradient, and the actual heat generation rate gradient at the time of actual combustion is determined.

In addition, the reference heat generation rate gradients and the reference peak positions (or reference rising timings) of the plurality of reference heat generation rate waveforms according to the operation state quantities and the operation conditions of the engine 1 may be stored in advance in the ROM of the ECU 100, and the reference heat generation rate gradients and the reference peak positions (or reference rising timings) may be read from the ROM of the ECU 100 according to the actual operation state quantities and the actual operation conditions of the engine 1.

—Correction Control—

Next, an example of correction control executed by the ECU 100 will be described.

First, in a diesel engine, if the amount of oxygen in a cylinder (combustion chamber) is short, combustion degrades and smoke is apt to be generated. In order to suppress such generation of smoke, it is necessary to appropriately correct shortage of the amount of oxygen with respect to fuel.

Here, even if the amount of oxygen is small with respect to fuel, the total amount of heat generated (heat generation efficiency) does not change. However, since combustion does not easily proceed (since flame propagation becomes slow), the gradient of an actual heat generation rate becomes gentle in the course (after the actual heat generation rate has risen) of the heat generation rate gradient, and a deviation occurs between the actual heat generation rate gradient and a reference heat generation rate gradient (refer to FIG. 5). Therefore, when an actual heat generation rate waveform and the reference heat generation rate gradient diverge from each other in the course of the heat generation rate gradient, it can be said that the amount of oxygen is small with respect to fuel. On the basis of such knowledge, in this embodiment, when a predetermined amount or more of deviation occurs between the reference heat generation rate gradient and the actual heat generation rate gradient after the rising of the heat generation rate, generation of smoke is suppressed by correcting the control parameters of the engine 1 such that the deviation is eliminated, thereby solving the shortage of the amount of oxygen with respect to fuel.

Figure 4:
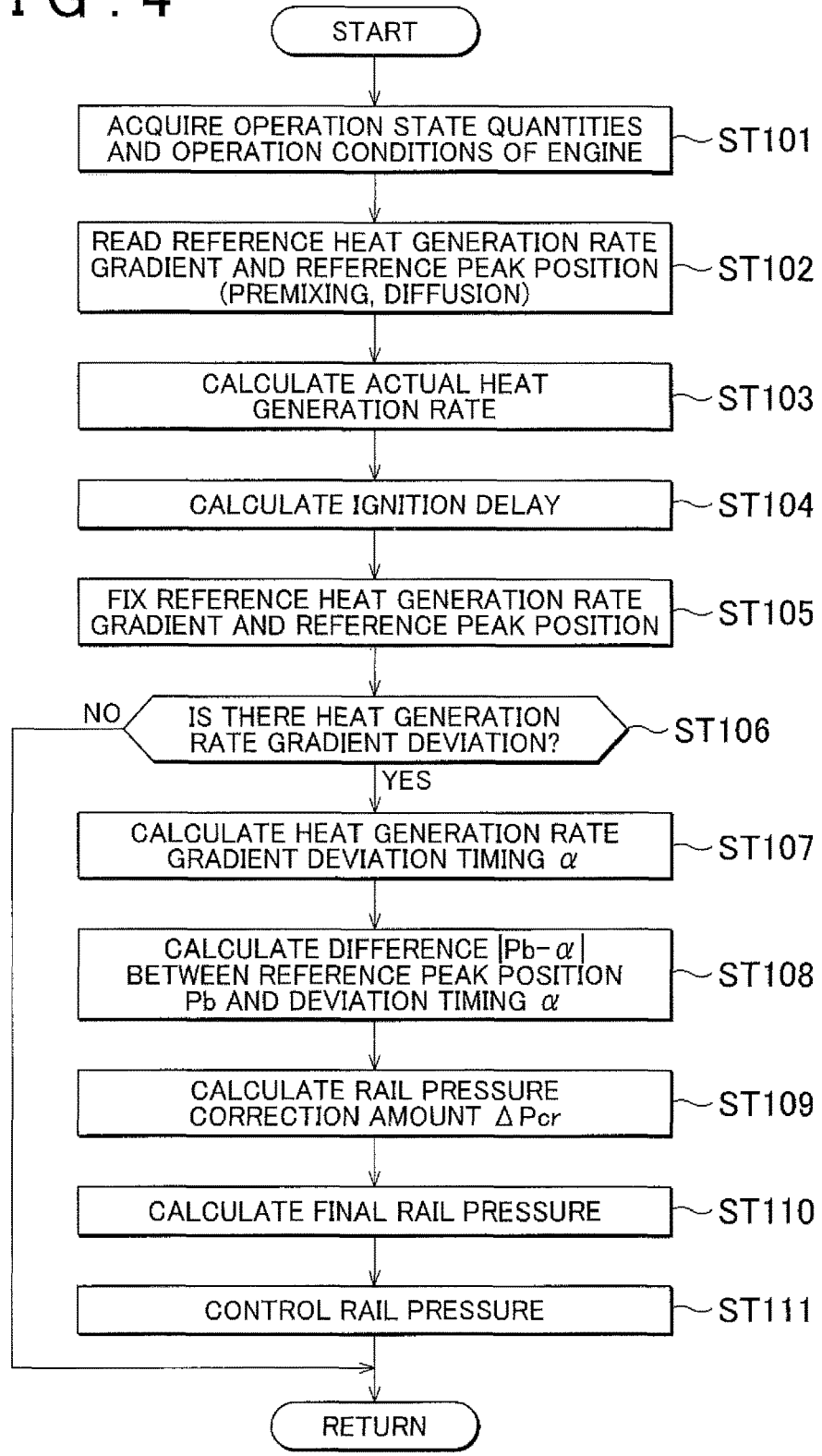
FIG. 4 is a flowchart illustrating an example of correction control.

A specific example of such correction control will be described with reference to a flowchart of FIG. 4. In the ECU 100, the flowchart illustrated in FIG. 4 is executed whenever a combustion stroke is performed in any cylinder after the engine 1 is started. In this example, combustion of fuel injected in the main injection is targeted.

If the flowchart of FIG. 4 is started, operation state quantities and operation conditions of the engine 1 are acquired in Step ST101. Examples of the operation state quantities of the engine 1 include the engine rotation speed calculated on the basis of the detection value of the crank position sensor 40, the accelerator opening (engine load) detected by the accelerator opening sensor 47, the in-cylinder pressure detected by the in-cylinder pressure sensor 4A, and the like. Examples of the operation conditions of the engine 1 include the coolant temperature detected by the water temperature sensor 46 and the intake air temperature detected by the intake air temperature sensor 49.

Next, a reference heat generation rate gradient Sb and a reference peak position Pb (refer to FIG. 5) are read in Step ST102. Specifically, reference heat generation rate waveforms (reference heat generation rate waveforms of both the premix combustion and the diffusive combustion) according to the operation state quantities and the operation conditions of the engine 1 which are acquired in Step ST101 are read among the plurality of reference heat generation rate waveforms stored in the ROM of the ECU 100, and reference heat generation rate gradients Sb and reference peak positions Pb of the reference heat generation rate waveforms of the premix combustion and the diffusive combustion are read.

Figure 5:
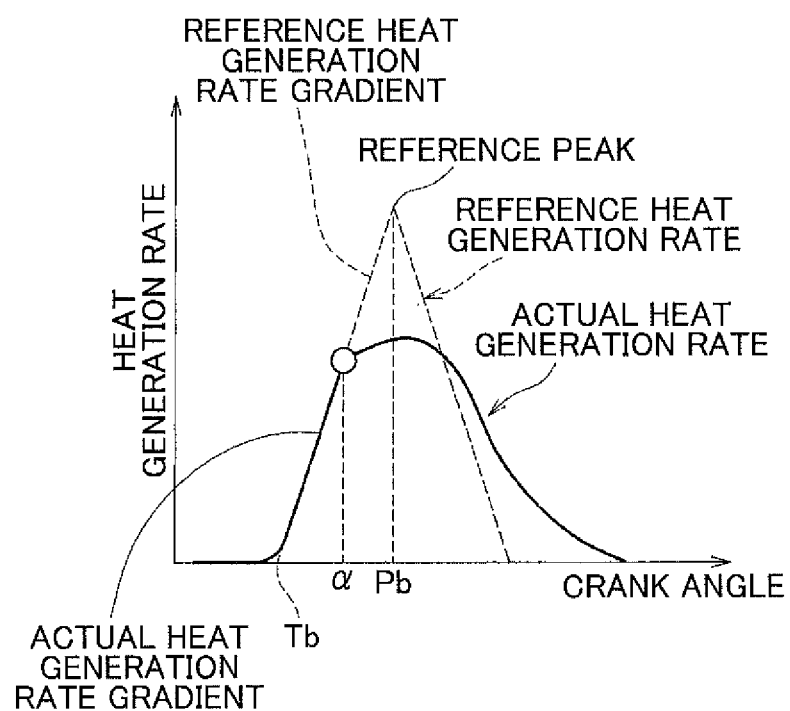
FIG. 5 is a graph illustrating a state where an actual heat generation rate gradient diverges from a reference heat generation rate gradient.

An actual heat generation rate is calculated in Step ST103. This actual heat generation rate is obtained on the basis of a change in the in-cylinder pressure detected by the in-cylinder pressure sensor 4A. Specifically, since there is a correlation between the heat generation rate in a cylinder and the in-cylinder pressure (the higher the heat generation rate becomes, the higher the in-cylinder pressure becomes), an actual heat generation rate is calculated from the change (transition) in the in-cylinder pressure detected by the in-cylinder pressure sensor 4A. This actual heat generation rate, for example, is successively calculated over a period from a combustion start time to a combustion end time. The actual heat generation rate as illustrated in FIG. 5 is obtained by the processing of Step ST103. In addition, the ECU 100, the in-cylinder pressure sensor 4A, and the like which execute the processing of Step ST103, are equivalent to "actual heat generation rate acquisition means" mentioned in the invention.

Ignition delay (period) is calculated in Step ST104. As for this ignition delay, a period (crank angle) until the actual heat generation rate rises from the fuel injection start time of the main injection (up to a combustion start) may be calculated on the basis of the detection values of the in-cylinder pressure sensor 4A and the crank position sensor 40.

In Step ST105, whether current combustion is the premix combustion or the diffusive combustion is determined on the basis of a calculation result for the ignition delay calculated in the above Step ST104. For example, when the ignition delay calculated in Step ST104 is equal to or greater than a predetermined value (threshold which discriminates the premix combustion and diffusive combustion (value calculated in experiments or simulations in advance)), the current combustion is determined to be the premix combustion, and when ignition delay is smaller than a predetermined value, the current combustion is determined to be the diffusive combustion. When the current combustion is determined to be the premix combustion, those read from the reference heat generation rate waveform of the premix combustion in the above Step ST102 are fixed as the reference heat generation rate gradient Sb and the reference peak position Pb. On the other hand, when the current combustion is determined to be the diffusive combustion, those read from the reference heat generation rate waveform of the diffusive combustion in the above Step ST102 are fixed as the reference heat generation rate gradient Sb and the reference peak position Pb.

In Step ST106, it is determined whether or not a deviation occurs between the reference heat generation rate gradient Sb (the reference heat generation rate gradient after the rising of the reference heat generation rate) fixed in the above Step ST105, and an actual heat generation rate gradient Sr (the actual heat generation rate gradient after the rising of the actual heat generation rate) calculated in Step ST103. Specifically, a difference |Sb−Sr| between the reference heat generation rate gradient Sb fixed in Step ST105 and the actual heat generation rate gradient Sr calculated in Step ST103 is calculated, and when the calculated gradient difference |Sb−Sr| becomes equal to or greater than a predetermined value Th, it is determined that a deviation (deviation equal to or greater than a predetermined amount) occurs in the heat generation rate gradient (Step ST106: Yes), and the processing proceeds to Step ST107.

On the other hand, in the processing of Step ST106, when the gradient difference between the reference heat generation rate gradient Sb and the actual heat generation rate gradient Sr is smaller than the above predetermined value Th in a period from the combustion start time (the rising time of the heat generation rate) Tb to the reference peak position Pb, a determination result of Step ST106 becomes a negative determination (No), and the current processing is ended without performing the following correction processing (calculation processing of a rail pressure correction amount ΔPcr) or the like.

As for the predetermined value Th used for the deviation determination of Step ST106, for example, a limiting value of an allowable range (a range where smoke resulting from the shortage of the amount of oxygen with respect to fuel is not generated) of an incline (made gentle) in the actual heat generation rate gradient Sr with respect to the reference heat generation rate gradient Sb is acquired in advance by experiments or simulations, and a value set based on the limiting value is set as the predetermined value Th.

In Step ST107, the timing (heat generation rate gradient deviation timing α (crank angle)) at which the reference heat generation rate gradient Sb and the actual heat generation rate gradient Sr diverge from each other is calculated. Specifically, a crank angle at the time when the above-mentioned gradient difference |Sb−Sr| becomes equal to or greater than the predetermined value Th (at the time when the gradient deviation is determined) is calculated from the detection value of the crank position sensor 40, and the calculated crank angle is used as the heat generation rate gradient deviation timing α (refer to FIG. 5).

In Step ST108, a crank angle difference |Pb−α| between the reference peak position Pb (crank angle) fixed in Step ST105 and the heat generation rate gradient deviation timing α (crank angle) calculated in Step ST107 is calculated.

In Step ST109, a rail pressure correction amount (boosted pressure correction amount) ΔPcr is calculated with reference to a rail pressure correction amount map on the basis of the crank angle difference |Pb−α| calculated in Step ST108. The rail pressure correction amount map is mapped in advance by obtaining, through experiments or simulations, such a rail pressure correction amount ΔPcr (the rail pressure correction amount capable of solving the shortage of the amount of oxygen with respect to fuel) that the deviation between the reference heat generation rate gradient Sb and the actual heat generation rate gradient Sr is eliminated, with the above crank angle difference |Pb−α| as a parameter, and is stored in the ROM of the ECU 100. In this rail pressure correction amount map, the point that the greater the shortage of the amount of oxygen with respect to fuel becomes, the earlier the actual heat generation rate gradient becomes gentle and the earlier the above heat generation rate gradient deviation timing α becomes, is taken into consideration, and the greater the above crank angle difference |Pb−α| becomes (the farther the deviation timing α between the reference heat generation rate gradient Sb and the actual heat generation rate gradient Sr is separated from the reference peak position Pb), the more the rail pressure correction amount ΔPcr is set so as to become great. In addition, the rail pressure correction amount ΔPcr may be calculated according to a calculation expression.

In Step ST110, a final rail pressure is calculated by calculating a target rail pressure with reference to the map or the like on the basis of the operation state quantities (the engine rotation speed, the accelerator opening, and the like) of the engine 1 and by adding the rail pressure correction amount ΔPcr calculated in the above Step ST109 to the target rail pressure. Then, the suction control valve 21A of the supply pump 21 is controlled so that the actual rail pressure (the rail pressure detected by the rail pressure sensor 41) coincides with the final rail pressure (final rail pressure>target rail pressure) calculated in this way (Step ST111). By performing the correction control in which the rail pressure becomes high in this way, the mixed state of fuel and oxygen becomes excellent, and a spray state becomes excellent. Thus, the shortage of the amount of oxygen with respect to fuel can be solved. This correction control may be performed at the time of fuel injection in the subsequent combustion stroke in a targeted cylinder or may be performed at the time of fuel injection in another cylinder corresponding to a combustion stroke subsequent to the combustion stroke of the targeted cylinder.

As described above, according to this embodiment, when a deviation occurs between the reference heat generation rate gradient Sb after the rising of the heat generation rate and the actual heat generation rate gradient Sr after the rising of the heat generation rate, the rail pressure is corrected such that the deviation between the reference heat generation rate gradient Sb and the actual heat generation rate gradient Sr is eliminated. Thus, the shortage of the amount of oxygen with respect to fuel can be solved, and generation of smoke can be suppressed.

In this embodiment, the farther the deviation timing α between the reference heat generation rate gradient Sb and the actual heat generation rate gradient Sr is separated from the reference peak position Pb, that is, the greater the shortage of the amount of oxygen with respect to fuel becomes, the greater the correction amount of the rail pressure becomes. Thus, the shortage of the amount of oxygen with respect to fuel can be precisely corrected, and generation of smoke can be more effectively suppressed.

—Another Example of Correction Control—

Next, another example of the correction control executed by the ECU 100 will be described with reference to a flowchart of FIG. 6. In the ECU 100, the flowchart illustrated in FIG. 6 is executed whenever a combustion stroke is performed in any cylinder after the engine 1 is started. Even in this example, combustion of fuel injected in the main injection is targeted.

First, in Step ST201, operation state quantities and operation conditions of the engine 1 are acquired similar to Step ST101 of the above-mentioned FIG. 4. In Step ST202, a reference heat generation rate gradient Sb and a reference rising timing Tb (refer to FIG. 5) are read by the same processing as the above Step ST102. In Step ST203, an actual heat generation rate is calculated by the same processing as the above Step ST103. In Step ST204, ignition delay (period) is calculated by the same processing as the above Step ST104. In Step ST205, whether current combustion is the premix combustion or the diffusive combustion is determined by the same processing as the above Step ST105 on the basis of a calculation result for the ignition delay calculated in the above Step ST204. When the current combustion is determined to be the premix combustion, those read from the reference heat generation rate waveform of the premix combustion in the above Step ST202 are fixed as the reference heat generation rate gradient Sb and the reference rising timing Tb. On the other hand, when the current combustion is determined to be the diffusive combustion, those read from the reference heat generation rate waveform of the diffusive combustion in the above Step ST202 are fixed as the reference heat generation rate gradient Sb and the reference rising timing Tb.

In Step ST206, it is determined whether or not a deviation occurs between the reference heat generation rate gradient Sb and the actual heat generation rate gradient Sr through the same processing as the above Step ST106, and when the determination result is a positive determination (Yes) (when a gradient deviation occurs), the process proceeds to Step ST207. On the other hand, in the processing of Step ST206, when the gradient difference between the reference heat generation rate gradient Sb and the actual heat generation rate gradient Sr is smaller than the above predetermined value Th in the period from the reference rising timing Tb to the reference peak position Pb, a determination result of Step ST206 becomes a negative determination (No), and the current processing is ended without performing the following correction processing (calculation processing of the rail pressure correction amount $\Delta Pcr$) or the like.

In Step ST207, a heat generation rate gradient deviation timing $\alpha$ (crank angle) is calculated by the same processing as the above Step ST107.

In Step ST208, a crank angle difference $|Tb-\alpha|$ between the reference rising timing Tb (crank angle) fixed in Step ST205 and the heat generation rate gradient deviation timing $\alpha$ (crank angle) calculated in Step ST207 is calculated.

In Step ST209, a rail pressure correction amount (boosted pressure correction amount) $\Delta Pcr$ is calculated with reference to the rail pressure correction amount map on the basis of the crank angle difference $|Tb-\alpha|$ calculated in Step ST208. The rail pressure correction amount map is given by mapping a rail pressure correction amount $\Delta Pcr$ (a rail pressure correction amount capable of solving the shortage of the amount of oxygen with respect to fuel) obtained in advance by experiments or simulations, with the above crank angle difference $|Tb-\alpha|$ as a parameter, and is stored in the ROM of the ECU 100. Here, the rail pressure correction amount is such an amount that the deviation between the reference heat generation rate gradient Sb and the actual heat generation rate gradient Sr is eliminated. In this rail pressure correction amount map, the point that the greater the shortage of the amount of oxygen with respect to fuel becomes, the earlier the actual heat generation rate gradient becomes gentle and the earlier the above heat generation rate gradient deviation timing $\alpha$ becomes, is taken into consideration, and the smaller the above crank angle difference $|Tb-\alpha|$ becomes (the closer the deviation timing $\alpha$ between the reference heat generation rate gradient Sb and the actual heat generation rate gradient Sr is brought to the reference rising timing Tb), the more the rail pressure correction amount $\Delta Pcr$ is set so as to become great. In addition, the rail pressure correction amount $\Delta Pcr$ may be calculated according to a calculation expression.

In Step ST210, a final rail pressure is calculated by calculating a target rail pressure with reference to the map or the like on the basis of the operation state quantities (the engine rotation speed, the accelerator opening, and the like) of the engine 1 and by adding the rail pressure correction amount $\Delta Pcr$ calculated in the above Step ST209 to the target rail pressure. Then, the suction control valve 21A of the supply pump 21 is controlled so that the actual rail pressure (the rail pressure detected by the rail pressure sensor 41) coincides with the final rail pressure (final rail pressure>target rail pressure) calculated in this way (Step ST211). By performing the correction control in which the rail pressure becomes high in this way, the mixed state of fuel and oxygen becomes excellent, and a spray state becomes excellent. Thus, the shortage of the amount of oxygen with respect to fuel can be solved. This correction control may be performed at the time of fuel injection in the subsequent combustion stroke in a targeted cylinder or may be performed at the time of fuel injection in another cylinder corresponding to a combustion stroke subsequent to the combustion stroke of the targeted cylinder.

Even in this embodiment, when a predetermined amount or more of deviation occurs between the reference heat generation rate gradient Sb after the rising of the heat generation rate and the actual heat generation rate gradient Sr after the rising of the heat generation rate, the rail pressure is corrected such that the deviation between the reference heat generation rate gradient Sb and the actual heat generation rate gradient Sr is eliminated. Thus, the shortage of the amount of oxygen with respect to fuel can be solved, and generation of smoke can be suppressed.

Even in this embodiment, the closer the deviation timing $\alpha$ between the reference heat generation rate gradient Sb and the actual heat generation rate gradient Sr is brought to the reference rising timing Tb, that is, the greater the shortage of the amount of oxygen with respect to fuel becomes, the greater the correction amount of the rail pressure becomes. Thus, the shortage of the amount of oxygen with respect to fuel can be precisely corrected, and generation of smoke can be more effectively suppressed.

In the above-mentioned respective embodiments, when a predetermined amount or more of deviation occurs between the reference heat generation rate gradient Sb after the rising of the heat generation rate and the actual heat generation rate gradient Sr after the rising of the heat generation rate, the rail pressure is corrected such that the deviation therebetween is eliminated. However, the invention is not limited to this, and a main injection amount may be corrected such that the deviation between the reference heat generation rate gradient Sb and the actual heat generation rate gradient Sr is eliminated.

In this case, the main injection amount is corrected to decrease by using a map (a map set in advance by experiments or simulations) in which the correction amount (a decrease correction amount of the main injection amount capable of solving the shortage of the amount of oxygen with respect to fuel) of the main injection amount such that the deviation (gradient difference) between the reference heat generation rate gradient Sb and the actual heat generation rate gradient Sr is eliminated is set or by using a calculation expression, with the above crank angle difference ($|Pb-\alpha|$ or $|Tb-\alpha|$) as a parameter. By decreasing the main injection amount in this way, the shortage of the amount of oxygen with respect to fuel can be solved, and generation of smoke can be suppressed. In addition, in order to secure the total amount of fuel injected, the amount of fuel injected equivalent to the decreased amount of the main injection amount is allocated for the pilot injection and the after injection.

The correction of such main injection amount and the correction of the above-mentioned rail pressure may be executed in combination.

—Comparison with Related Art—

Here, as a technique of correcting control parameters of an engine using an actual heat generation rate and a reference heat generation rate, there is a technique described in Japanese Patent Application Publication No. 2011-085061 (JP 2011-085061 A). In the technique described in JP 2011-085061 A, transition of pressure in a combustion chamber is detected by an in-cylinder pressure sensor, an actual peak position (a crank angle corresponding to the peak of an actual heat generation rate in the combustion chamber) is obtained on the basis of transition of the pressure, and the deviation amount of this actual peak position (the deviation amount with respect to the peak position of the reference heat generation rate in a normal operation state) is calculated. Then, the amount of fuel injected is corrected on the basis of an oxygen concentration deviation amount corresponding to the deviation amount of the actual peak position.

However, in such related art, shortage of the amount of oxygen with respect to fuel occurs, and combustion becomes slow. As a result, for example, when the gradient of the actual heat generation rate becomes flat (when the gradient reaches approximately 0), the peak position of the actual heat generation rate cannot be precisely detected. A position which is greatly different from the peak position of the actual heat generation rate may be erroneously detected as the actual peak position, and correction may not be appropriately performed.

In contrast, in the present invention (present embodiment), a phenomenon which certainly appears when the shortage of the amount of oxygen with respect to fuel occurs, that is, a phenomenon in which the actual heat generation rate gradient diverges from the reference heat generation rate gradient in the course of the heat generation rate gradient (after the actual heat generation rate rises) if the amount of oxygen is small with respect to fuel is taken into consideration, and an engine control parameter (at least one of the rail pressure and the main injection amount) is corrected such that the deviation is eliminated. Thus, the shortage of the amount of oxygen with respect to fuel can be precisely corrected, and generation of smoke can be effectively suppressed.

—Still Another Example of Correction Control—

Figure 7A:
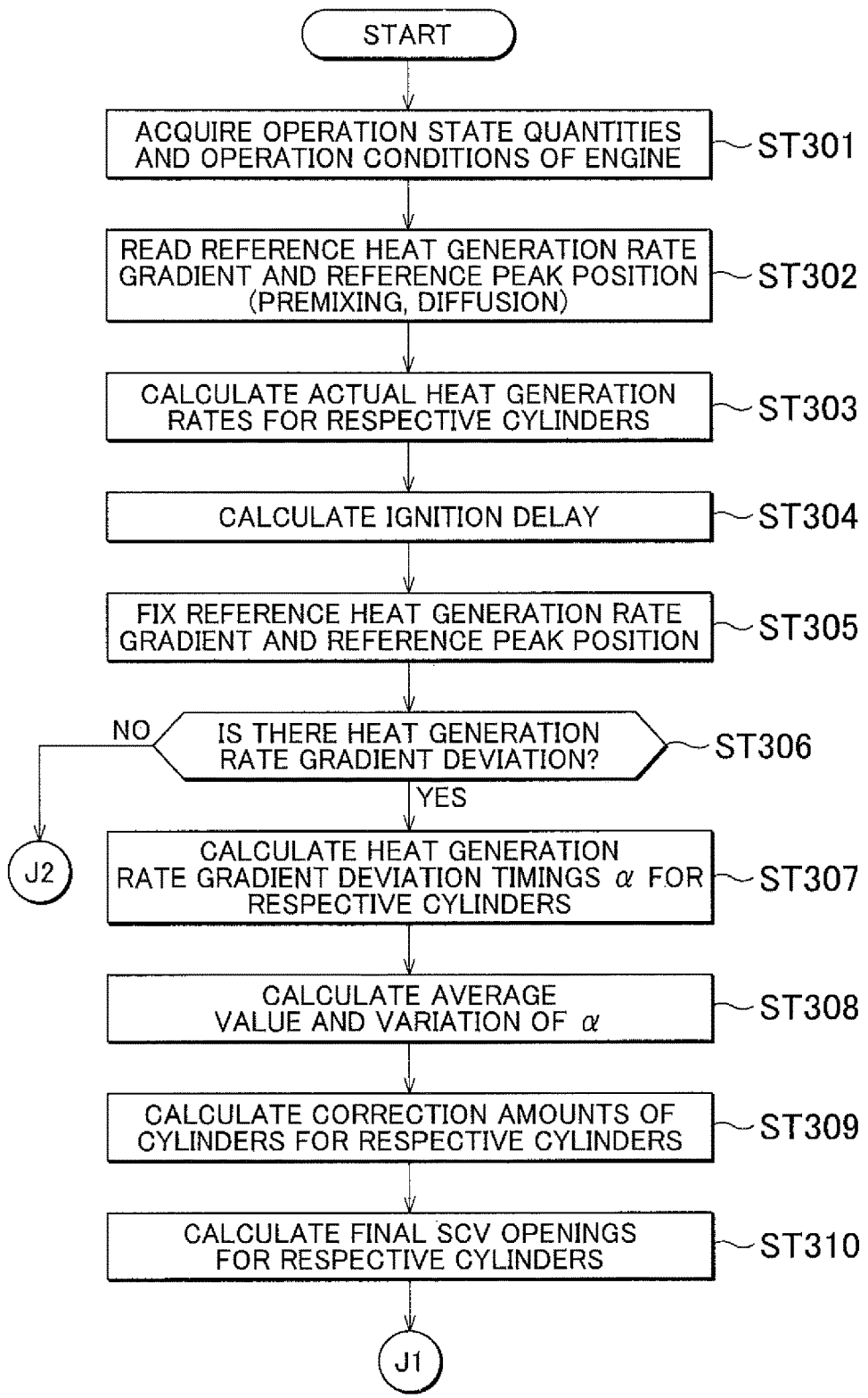
FIGS. 7A and 7B are flowcharts illustrating still another example of the correction control.
Figure 7B:
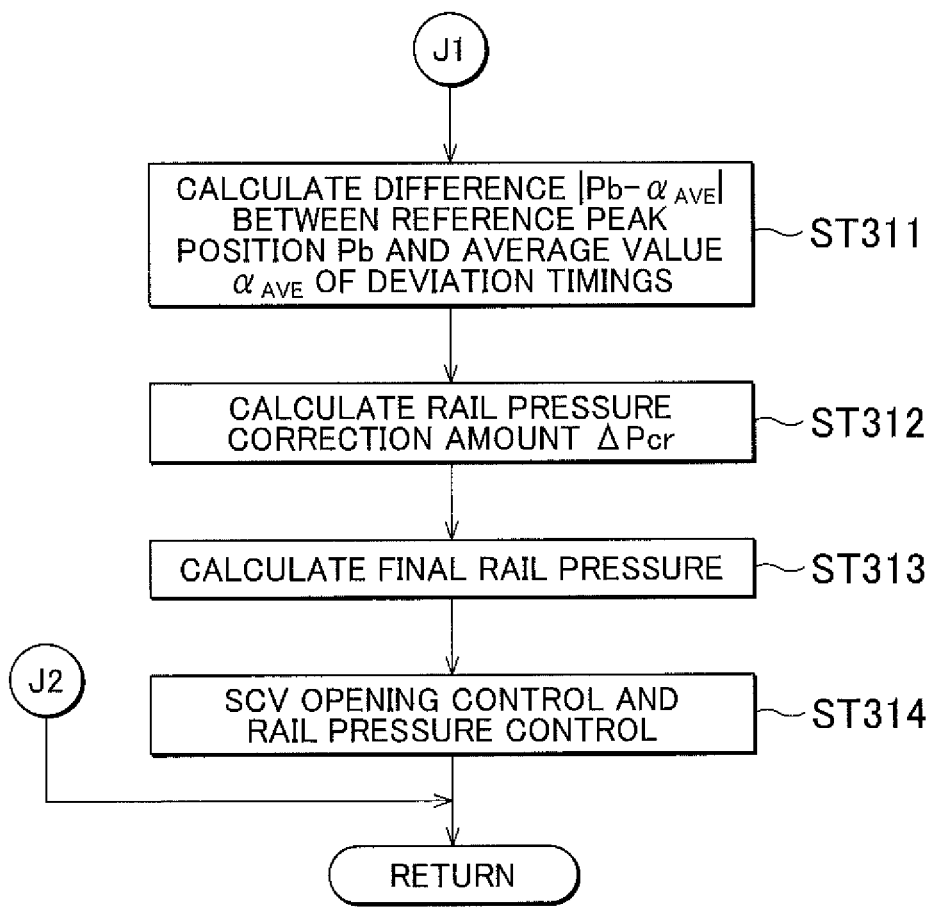

Next, still another example of the correction control executed by the ECU 100 will be described with reference to flowcharts of FIGS. 7A and 7B. The flowcharts illustrated in FIGS. 7A and 7B are executed, for example, for each combustion cycle in the ECU 100. Even in this example, combustion of fuel injected in the main injection is targeted.

Since the processing of respective Step ST301 to Step ST305 illustrated in FIG. 7A are the same as the processing of the respective Step ST101 to Step ST105 of the flowchart of the above-mentioned FIG. 4, the detailed description thereof will be omitted. However, the processing of calculating the actual heat generation rate in Step ST303 is executed for the respective cylinders.

In Step ST306, whether or not a deviation occurs between a reference heat generation rate gradient Sb and an actual heat generation rate gradient Sr is determined by the same processing as the above Step ST106. Here, when the above heat generation rate gradient deviations occur in all the cylinders (four cylinders), it is determined that a deviation occurs between the heat generation rate gradients (Step ST306: Yes), and the processing proceeds to Step ST307. On the other hand, when the determination result of Step ST306 is a negative determination (No), the current processing is ended without performing the following correction processing (correction processing of inter-cylinder variation in the deviation timing and the calculation processing of the above rail pressure correction amount $\Delta Pcr$) or the like. In addition, in Step ST306, for example, when the above actual heat generation rate gradients diverge in three or more cylinders, the above heat generation rate gradient deviation may be determined to occur.

Figure 8A:
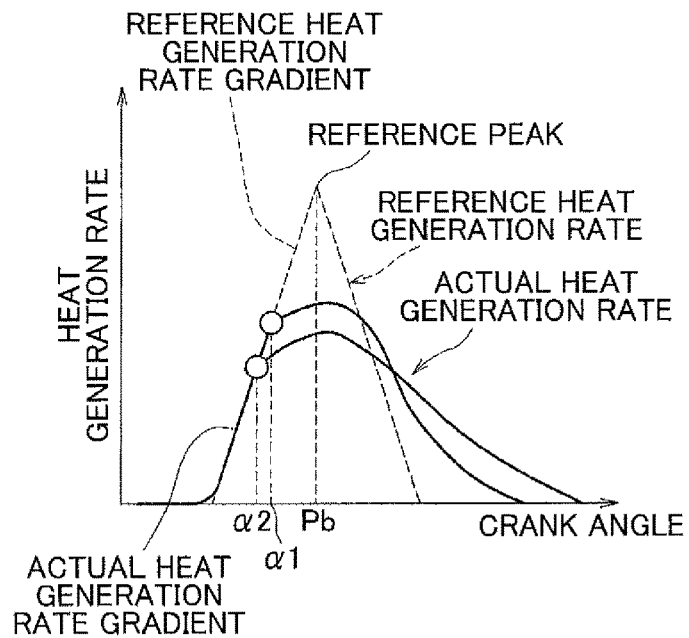
FIGS. 8A and 8B are graphs illustrating states where the actual heat generation rate gradient diverges from the reference heat generation rate gradient.
Figure 8B:
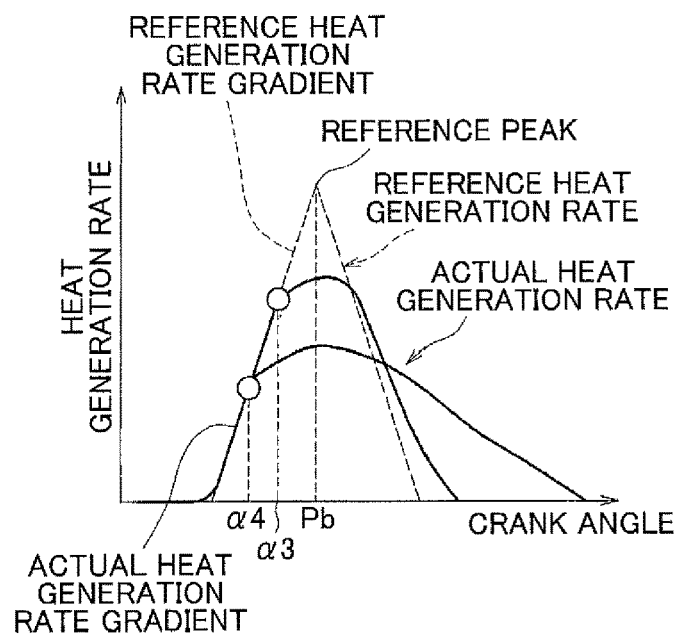

In Step ST307, heat generation rate gradient deviation timings $\alpha$ (crank angles) are calculated for the respective cylinders by the same processing as the above Step ST107. Heat generation rate gradient deviation timings $\alpha 1$, $\alpha 2$, $\alpha 3$, $\alpha 4$, for example, as illustrated in FIGS. 8A and 8B are calculated by the processing in this Step ST307.

In Step ST308, an average value (addition average value) $\alpha_{AVE}$ of the heat generation rate gradient deviation timings $\alpha 1$, $\alpha 2$, $\alpha 3$, $\alpha 4$ (crank angles) of the respective cylinders calculated in Step ST307 is calculated. Variation amounts $\Delta\alpha 1$, $\Delta\alpha 2$, $\Delta\alpha 3$, and $\Delta\alpha 4$ (refer to FIG. 10) with respect to the average value $\alpha_{AVE}$ of the heat generation rate gradient deviation timings $\alpha 1$, $\alpha 2$, $\alpha 3$, $\alpha 4$ of the respective cylinders are calculated. In addition, for example, when heat generation rate gradient deviations occurs in three cylinders, the average value of the heat generation rate gradient deviation timings of these three cylinders may be calculated.

In Step ST309, correction amounts (SCV opening correction amounts) of the respective openings of the swirl control valves 66 of the respective cylinders are calculated. Specifically, the SCV opening correction amounts (the inter-cylinder correction amounts) such that the heat generation rate gradient deviation timings of all the cylinders reach the average value $\alpha_{AVE}$ (the same timing) are calculated for the respective cylinders, on the basis of the variation amounts $\Delta\alpha 1$, $\Delta\alpha 2$, $\Delta\alpha 3$, and $\Delta\alpha 4$ of the respective cylinders calculated in Step ST308 (deviation amounts with respect to the average value $\alpha_{AVE}$).

Figure 9:
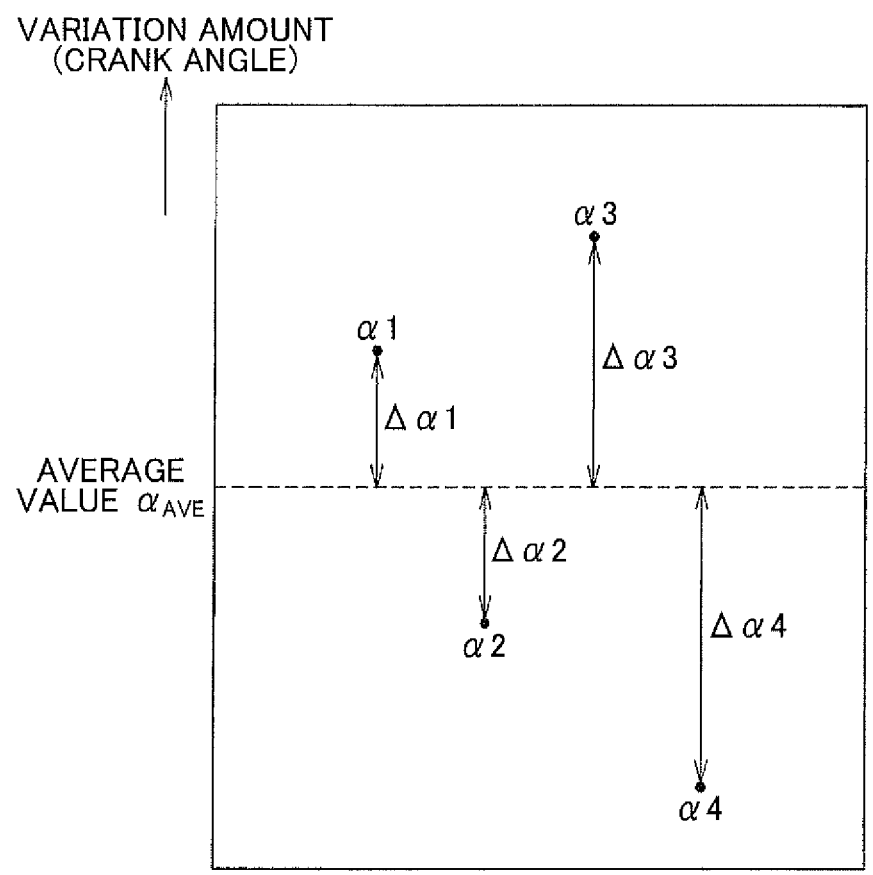
FIG. 9 is a diagram illustrating inter-cylinder variations of the timing at which the actual heat generation rate gradient diverges from the reference heat generation rate gradient.

For example, as illustrated in FIG. 9, when the deviation timing deviates to a negative side (side opposite to a reference peak) with respect to the average value $\alpha_{AVE}$ as with the heat generation rate gradient deviation timing $\alpha 2$, a SCV opening correction amount (a correction amount which makes the SCV opening small) which makes the swirl rate in the combustion chamber 3 high so that the deviation amount $\Delta\alpha 2$ of the deviation timing becomes small is calculated. If the swirl rate is made high, mixture of fuel and oxygen is promoted and the heat generation rate gradient deviation timing $\alpha 2$ coincides with the average value $\alpha_{AVE}$. On the other hand, for example, when the deviation timing diverges to a positive side (the reference peak side) with respect to the average value $\alpha_{AVE}$ as with the heat generation rate gradient deviation timing $\alpha 1$, the SCV opening correction amount (the correction amount which makes the SCV opening great) which makes the swirl rate in the combustion chamber 3 low so that the deviation amount $\Delta\alpha 1$ of the deviation timing becomes small is calculated. If the swirl rate is made low, mixture of fuel and oxygen is suppressed and the heat generation rate gradient deviation timing $\alpha 1$ coincides with the average value $\alpha_{AVE}$. The SCV opening correction amounts are also similarly calculated regarding the heat generation rate gradient deviation timings α3, α4.

In addition, the SCV opening correction amounts for solving the deviation amounts of the above heat generation rate gradient deviation timings are obtained in advance by experiments or simulations, and the above-mentioned SCV opening correction amounts can be calculated on the basis of the map (or calculation expression) in which the relationship between the deviation amounts and the SCV opening correction amounts is specified.

In Step ST310, final SCV openings are calculated for the respective cylinders by calculating target SCV openings with reference to the map or the like on the basis of the operation state quantities (the engine rotation speed, the accelerator opening, and the like) of the engine 1 and by adding the SCV opening correction amounts for the respective cylinders calculated in the above Step ST309 to the target SCV openings. Then, the swirl control valves 66 of the respective cylinders are controlled on the basis of the respective final SCV openings calculated in this way (Step ST314). The variations in the heat generation rate gradient deviation timings between the cylinders can be corrected by such correction control. This correction control is executed, for example, in the next combustion cycle (intake stroke of each cylinder).

Next, in Step ST311 of FIG. 7B, a crank angle difference $|Pb-\alpha_{AVE}|$ between the reference peak position Pb (crank angle) fixed in Step ST305 and the average value $\alpha_{AVE}$ (crank angle) of the heat generation rate gradient deviation timings calculated in Step ST308 is calculated.

In Step ST312, a rail pressure correction amount (boosted pressure correction amount) ΔPcr is calculated with reference to the rail pressure correction amount map on the basis of the crank angle difference $|Pb-\alpha_{AVE}|$ calculated in Step ST311. For example, the same map as the rail pressure correction amount map used in Step ST108 of the above-mentioned FIG. 4 is used as this rail pressure correction amount map. In addition, the rail pressure correction amount ΔPcr may be calculated according to a calculation expression.

In Step ST313, a final rail pressure is calculated by calculating a target rail pressure with reference to the map or the like on the basis of the operation state quantities (the engine rotation speed, the accelerator opening, and the like) of the engine 1 and by adding the rail pressure correction amount ΔPcr calculated in the above Step ST312 to the target rail pressure. Then, the suction control valve 21A of the supply pump 21 is controlled so that the actual rail pressure (the rail pressure detected by the rail pressure sensor 41) coincides with the final rail pressure (final rail pressure>target rail pressure) calculated in this way (Step ST314). By performing the correction control in which the rail pressure becomes high in this way, the mixed state of fuel and oxygen becomes excellent, and a spray state becomes excellent. Thus, the shortage of the amount of oxygen with respect to fuel can be solved. This correction control is executed, for example, in the next combustion cycle (at the time of fuel injection of each cylinder).

In this embodiment, the rail pressure correction amount ΔPc is calculated by calculating the crank angle difference $|Pb-\alpha_{AVE}|$ between the reference peak position Pb and the average value $\alpha_{AVE}$ of the heat generation rate gradient deviation timings. However, the rail pressure correction amount ΔPc may be calculated by calculating the crank angle difference $|Tb-\alpha|$ between the reference rising timing Tb and the heat generation rate gradient deviation timing α as described above.

In this embodiment, the SCV opening (swirl rate) of the swirl control valve 66 is corrected on the basis of the variations in the heat generation rate gradient deviation timings in the respective cylinders. However, the invention is not limited to this. The main injection amounts of the respective cylinders may be corrected, or the SCV opening correction and the main injection amount correction may be executed in combination. When the main injection amount is corrected and when the deviation amount with respect to the above-described average value $\alpha_{AVE}$ is on a negative side, the main injection amount may be corrected to decrease according to the deviation amount, and when the deviation amount is on a positive side, the main injection amount is corrected to increase according to the deviation amount.

Other Embodiments

In addition, the embodiment disclosed above is merely illustrative in all respects, and does not become a basis for limited interpretation. Therefore, the technical scope of the invention is not interpreted by only the above-mentioned embodiments, and is defined on the basis of the statement of the claims. All changes in meanings and scope equivalent to those of the claims are included in the technical scope of the invention.

For example, in the above-mentioned embodiments, correction is made on the basis of the timing at which the reference heat generation rate gradient Sb and the actual heat generation rate gradient Sr diverge from each other and the reference peak position (or reference rising timing). However, the invention is not limited to this. For example, the difference (deviation amount) between the reference heat generation rate gradient Sb and the actual heat generation rate gradient Sr at the time when a predetermined fixed time has passed from the time when it is determined that the reference heat generation rate gradient Sb and the actual heat generation rate gradient Sr diverges from each other (at the time before the reference peak position is reached) may be calculated, and setting a greater amount for at least one of the rail pressure and the main injection amount as the deviation amount becomes greater may be performed.

In the above-mentioned embodiments, the deviation between the reference heat generation rate gradient Sb and the actual heat generation rate gradient Sr is determined on the basis of the gradient difference |Sb-Sr| between the reference heat generation rate gradient Sb and the actual heat generation rate gradient Sr. However, the invention is not limited to this. For example, the deviation of the above gradient may be determined on the basis of the ratio (Sb/Sr or Sr/Sb) of the reference heat generation rate gradient Sb and the actual heat generation rate gradient Sr.

In the above-mentioned embodiments, the engine 1 is described to which the piezoelectric injector 23 changing the fuel injection rate by being brought into a valve-opened state of being fully opened in only an energization period is applied. However, the invention also can be applied to an engine to which a variable injection rate injector is applied.

In the above-mentioned embodiments, a case where the invention is applied to an in-line four-cylinder diesel engine 1 mounted on an automobile has been described. The invention is not limited to applications for automobiles, and may be applied to engines used for other applications. The number of cylinders or engine types (types such as an in-line engine, a V-type engine, and a horizontal opposed engine) is not particularly limited. The invention is not limited to the diesel engine using light oil as fuel, and may be applied to engines using other kinds of fuel.

The invention can be effectively used for the control of suppressing degradation of combustion resulting from the shortage of the amount of oxygen with respect to fuel, in internal combustion engines such as the diesel engine.

What is claimed is:

1. A controller for an internal combustion engine, the internal combustion engine including a fuel injection valve configured to supply fuel into a plurality of cylinders and swirl control valves provided in the respective cylinders, the controller comprising
an electronic control unit configured to
i) acquire an actual heat generation rate at a time of combustion, and
ii) correct at least one of a fuel injection pressure or an amount of fuel injected when a deviation amount between a reference heat generation rate gradient and an actual heat generation rate gradient is equal to or greater than a predetermined value such that the deviation amount decreases, iii) obtain, for the respective cylinders, deviation timings at which the deviation amounts between the reference heat generation rate gradient and the actual heat generation rate gradient become equal to or greater than the predetermined value when the deviation amounts between the reference heat generation rate gradient and the actual heat generation rate gradient are equal to or greater than the predetermined value, and
iv) correct at least one of openings of the swirl control valves such that the deviation timings of the respective cylinders become the same timing,
the reference heat generation rate gradient being a gradient of a predetermined reference heat generation rate at which a predetermined time elapses after a heat generation rate begins to rise, and
the actual heat generation rate gradient being a gradient of an actual heat generation rate acquired by the electronic control unit at which the predetermined time elapses after the heat generation rate begins to rise.

2. The controller according to claim 1,
wherein the electronic control unit is configured to
i) obtain an average value of the deviation timings of the plurality of cylinders,
ii) correct at least one of the openings of the swirl control valves of the respective cylinders such that the deviation timings of the respective cylinders become the average value, and
iii) set a correction amount for at least one of the fuel injection pressure or the amount of fuel injected to be greater as the average value of the deviation timings separates farther from a reference peak timing at which the reference heat generation rate becomes maximum.

3. The controller according to claim 1,
wherein the electronic control unit is configured to
i) obtain an average value of the deviation timings of the plurality of cylinders,
ii) correct at least one of the openings of the swirl control valves of the respective cylinders such that the deviation timings of the respective cylinders become the average value, and
iii) set a correction amount for at least one of the fuel injection pressure or the amount of fuel injected to be greater as the average value of the deviation timings is closer to a timing at which the reference heat generation rate begins to rise.

* * * * *